(12) United States Patent
Su et al.

(10) Patent No.: US 9,207,809 B2
(45) Date of Patent: Dec. 8, 2015

(54) OPTICAL TOUCH SYSTEM AND OPTICAL TOUCH CONTROL METHOD

(71) Applicant: PixArt Imaging Inc., Hsinchu (TW)

(72) Inventors: Tzung-Min Su, Hsinchu (TW);
Chi-Chieh Liao, Hsinchu (TW);
Han-Ping Cheng, Hsinchu (TW);
Chih-Hsin Lin, Hsinchu (TW);
Ming-Tsan Kao, Hsinchu (TW)

(73) Assignee: PIXART IMAGING INC., Hsinchu (TW)

( * ) Notice: Subject to any disclaimer, the term of this patent is extended or adjusted under 35 U.S.C. 154(b) by 281 days.

(21) Appl. No.: 13/856,432

(22) Filed: Apr. 3, 2013

(65) Prior Publication Data

US 2014/0043297 A1 Feb. 13, 2014

(30) Foreign Application Priority Data

Aug. 10, 2012 (TW) .................................. 101128949

(51) Int. Cl.
*G09G 5/00* (2006.01)
*G06F 3/042* (2006.01)
*G06F 3/041* (2006.01)

(52) U.S. Cl.
CPC .............. *G06F 3/042* (2013.01); *G06F 3/0418* (2013.01); *G06F 3/0428* (2013.01); *G06F 2203/04104* (2013.01)

(58) Field of Classification Search
CPC ........ G06F 3/042; G06F 3/041; G06F 3/0428; G06F 3/0416; G06F 3/0321; G06F 3/0325; G06F 3/0418
USPC ................................ 345/173, 175; 178/18.09
See application file for complete search history.

(56) References Cited

U.S. PATENT DOCUMENTS

| 8,269,158 | B2* | 9/2012 | Chen et al. .................. 250/203.1 |
| 8,937,612 | B2* | 1/2015 | Zhu et al. ........................ 345/175 |
| 2010/0295821 | A1* | 11/2010 | Chang et al. .................. 345/175 |
| 2011/0261016 | A1* | 10/2011 | Huang ........................... 345/175 |
| 2012/0162136 | A1 | 6/2012 | Chen et al. |

FOREIGN PATENT DOCUMENTS

| CN | 101907956 A | 12/2010 |
| CN | 102043540 A | 5/2011 |
| CN | 102043543 A | 5/2011 |
| CN | 102364418 A | 2/2012 |
| CN | 102541356 A | 7/2012 |

\* cited by examiner

*Primary Examiner* — Jennifer Nguyen
(74) *Attorney, Agent, or Firm* — Cheng-Ju Chiang

(57) ABSTRACT

An optical touch control method includes steps of: providing a bright background from at least one edge of a touch surface in a first period; providing illumination light to the touch surface in a second period; capturing a first image of an indicator object blocking a portion of the bright background in the first period; and capturing a second image of the indicator object reflecting the illumination light in the second period. An optical touch system is also provided.

15 Claims, 7 Drawing Sheets

OPTICAL TOUCH SYSTEM AND OPTICAL TOUCH CONTROL METHOD

TECHNICAL FIELD

The present invention relates to an optical touch technical field, and more particularly to an optical touch system and an optical touch control method.

BACKGROUND

Basically, today's optical touch system employs two image sensing devices for the touch sensing; wherein the imaging sensing device is configured to sense images on a touch surface of the optical touch system. Specifically, the optical touch system is configured to, when an indicator object closing to the touch surface is detected, determine the position of the indicator object relative to the touch surface according to the indicator object image (i.e., the light-blocking point) in the images captured by the image sensing device.

However, if there are two indicator objects on the touch surface and the two indicator objects are positioned within a specific distance or within a specific view angle from the image sensing device, and thereby resulting in one indicator object image blocking another indicator object image in the image captured by the image sensing device, the optical touch system may not correctly determine that there are two individual indicator objects on the touch surface due to the two indicator object images are merged to each other.

SUMMARY OF EMBODIMENTS

Therefore, an object of the present invention is to provide an optical touch system capable of fixing the aforementioned issues in prior art.

Another object of the present invention is to provide an optical touch control method capable of fixing the aforementioned issues in prior art.

The present invention provides an optical touch system, which includes a touch surface, three light emitting elements, two image sensing devices, two illumination devices and a processing unit. The touch surface is configured to have a quadrilateral structure defined by a first, second, third and fourth edges connected sequentially. The three light emitting elements are disposed at the first, second and third edges, respectively, and configured to emit light to the touch surface in a first period. The two image sensing devices are disposed at an intersecting corner of the fourth and first edges and an intersecting corner of the fourth and third edges, respectively. The two illumination devices are disposed close to or inside the two image sensing devices, respectively, and configured to emit light to illuminate the touch surface in a second period. The processing unit is electrically connected to the two image sensing devices and configured to control the two image sensing devices to sense the touch surface in the first period and thereby obtaining a first image and a second image, respectively, and control the two image sensing devices to sense the touch surface in the second period and thereby obtaining a third image and a fourth image, respectively.

The present invention further provides an optical touch system, which includes a touch surface, two light emitting elements, a reflective element, two image sensing devices, two illumination devices and a processing unit. The touch surface is configured to have a quadrilateral structure defined by a first, second, third and fourth edges connected sequentially. The two light emitting elements are disposed at the first and third edges, respectively, and configured to emit light to the touch surface in a first period. The reflective element is disposed at the second edge. The two image sensing devices are disposed at an intersecting corner of the fourth and first edges and an intersecting corner of the fourth and third edges, respectively. The two illumination devices are disposed close to or inside the two image sensing devices, respectively, and configured to emit light to illuminate the touch surface in a second period. The processing unit is electrically connected to the two image sensing devices and configured to control the two image sensing devices to sense the touch surface in the first period and thereby obtaining a first image and a second image, respectively, and control the two image sensing devices to sense the touch surface in the second period and thereby obtaining a third image and a fourth image, respectively.

The present invention still further provides an optical touch system, which includes a touch surface, at least one image sensing device, a background light emitting element and an illumination device. The background light emitting element is configured to emit light to illuminate the touch surface from at least one edge thereof in a first period and thereby generating a bright background for an image captured by the image sensing device. The illumination device is configured to provide illumination light to the touch surface in a second period. The at least one image sensing device is configured to capture a first image of an indicator object blocking a portion of the bright background in the first period and capture a second image of the indicator object reflecting the illumination light in the second period.

The present invention yet further provides an optical touch control method, which includes steps of: providing a bright background from at least one edge of a touch surface in a first period; providing illumination light to the touch surface in a second period; capturing a first image of an indicator object blocking a portion of the bright background in the first period; and capturing a second image of the indicator object reflecting the illumination light in the second period.

In summary, the optical touch system according to the present invention includes at least one light emitting element, at least one illumination device and at least one image sensing device. The light emitting element is disposed at an edge(s) of a touch surface of the optical touch system and configured to emit light to the touch surface in a first period and thereby generating a bright background for the image captured by the image sensing device. The illumination device is configured to provide illumination light to the touch surface in a second period so that an indicator object on the touch surface can reflect the illumination light. The image sensing device is configured sensing the touch surface and thereby obtaining two images in the first and second periods. If there are at least two indicator objects closing to the touch surface, the indicator objects in the image captured by the image sensing device in the first period will present light-blocking points and block a portion of the bright background; and the indicator objects in the image captured by the image sensing device in the second period will present reflective points and block. Thus, the optical touch system according to the present invention can correctly determine the actual number of the indicator object and consequently calculate the positions of the indicator objects relative to the touch surface according to the aforementioned light-blocking points and the edge information of the reflective points while performing the multi-touch operation.

BRIEF DESCRIPTION OF THE DRAWINGS

The above embodiments will become more readily apparent to those ordinarily skilled in the art after reviewing the following detailed description and accompanying drawings, in which.

DETAILED DESCRIPTION OF PREFERRED EMBODIMENTS

The disclosure will now be described more specifically with reference to the following embodiments. It is to be noted that the following descriptions of preferred embodiments are presented herein for purpose of illustration and description only. It is not intended to be exhaustive or to be limited to the precise form disclosed.

Figure 1:
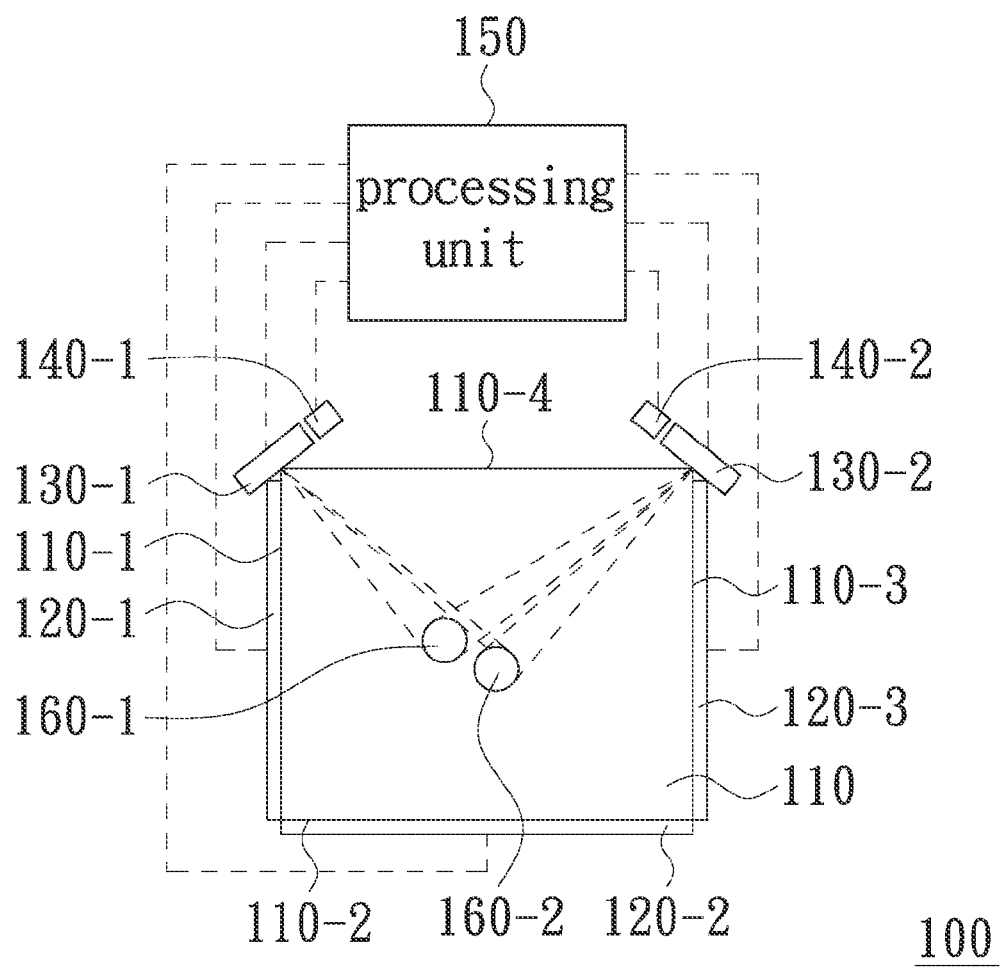
FIG. 1 is a schematic view of an optical touch system in accordance with an embodiment of the present invention.

FIG. 1 is a schematic view of an optical touch system in accordance with an embodiment of the present invention. As shown, the optical touch system 100 in this embodiment includes a touch surface 110, light emitting elements 120-1, 120-2 and 120-3, image sensing devices 130-1, 130-2, illumination devices 140-1, 140-2 and a processing unit 150. The touch surface 110 is configured to have a quadrilateral structure, which is defined by four sequentially-connected edges 110-1, 110-2, 110-3 and 110-4 thereof. The light emitting elements 120-1, 120-2 and 120-3 are disposed at the edges 110-1, 110-2 and 110-3, respectively, and configured to emit light to the touch surface 110 in a first period. In another embodiment, the light emitting elements 120-1, 120-2 and 120-3 each can be replaced by a light guide element, which is configured to receive light beams emitted from an external light source and direct the received light beams to illuminate the touch surface 110. The image sensing device 130-1 is disposed at an intersecting corner of the edges 110-4, 110-1; and the image sensing device 130-2 is disposed at an intersecting corner of the edges 110-4, 110-3.

The illumination devices 140-1, 140-2 are disposed close to or inside the image sensing devices 130-1, 130-2, respectively. In this embodiment, the illumination devices 140-1, 140-2 are disposed close to the image sensing devices 130-1, 130-2, respectively, and configured to emit light to illuminate the touch surface 110 in a second period. The processing unit 150 is electrically connected to the image sensing devices 130-1, 130-2 and configured to obtain the two images derived from the image sensing devices 130-1, 130-2 sensing the touch surface 110 in the first period and obtain another two images derived from the image sensing devices 130-1, 130-2 sensing the touch surface 110 in the second period. In another embodiment, the processing unit 150 is disposed in either the image sensing device 130-1 or the image sensing device 130-2.

In this embodiment, the processing unit 150 is further configured to, when detecting at least one indicator object (e.g., the indicator objects 160-1, 160-2) closing to the touch surface 110, determine the actual number of the indicator object and consequently calculate the position of the indicator object(s) relative to the touch surface 110 according to the light-blocking point(s) in the two images captured in the first period and the edge information of the reflective point(s) in the two images captured in the second period.

Taking the two indicator objects 160-1, 160-2 with specific relative positions as illustrated in FIG. 1 as an example. As shown, the image derived from the image sensing device 130-2 sensing the touch surface 110 in the first period has two light-blocking points; but the image derived from the image sensing device 130-1 sensing the touch surface 110 in the first period has one light-blocking point only. In addition, the another two images derived from the image sensing devices 130-1, 130-2 respectively sensing the touch surface 110 in the second period both have two reflective points; specifically, it is to be noted that the two reflective points derived from the image sensing device 130-1 overlap partially, which leads the overlapping area of the two reflective points has an image edge of one of the two reflective points. In this example, the aforementioned image edge is referred to the image edge of the reflective point formed by the indicator object 160-1 and closing to the reflective point formed by the indicator object 160-2. Therefore, the processing unit 150 can, according to the aforementioned information contained in the captured images, correctly determine that there are two indicator objects closing to the touch surface 110 and consequently calculate the positions of the two indicator objects relative to the touch surface 110.

In summary, the processing unit 150 will determine that there are two indicator objects closing to the touch surface 110 if one of the two images, derived from the image sensing devices 130-1, 130-2 sensing the touch surface 110 in the first period, has two light-blocking points, the other one of the two image has one light-blocking point only; and the two images, derived from the image sensing devices 130-1, 130-2 sensing the touch surface 110 in the second period, both have two reflective points, wherein the two reflective points in one of the image overlap partially, which leads the overlapping area of the two reflective points has an image edge of one of the two reflective points.

It is understood that the the processing unit 150 will directly determine that there are two indicator objects closing to the touch surface 110 if the two images, derived from the image sensing devices 130-1, 130-2 in the first period, both have two distinguishable light-blocking points and the two images, derived from the image sensing devices 130-1, 130-2 in the second period, both have two distinguishable reflective points.

Therefore, according to the aforementioned description, it is understood that the optical touch system 100 according to the present invention can determine the actual number of the indicator objects on the touch surface 110 while performing the multi-touch operation and consequently calculate the position of the indicator object(s) relative to the touch surface 110. In addition, the optical touch system 100 of the present invention can also prevent the number of the indicator object from being determined while performing touch sensing operation in a conventional single-touch optical touch system. The wrong indicator object number determination issue will be described more clear in the following description with a reference of FIGS. 2A, 2B.

Figure 2A:
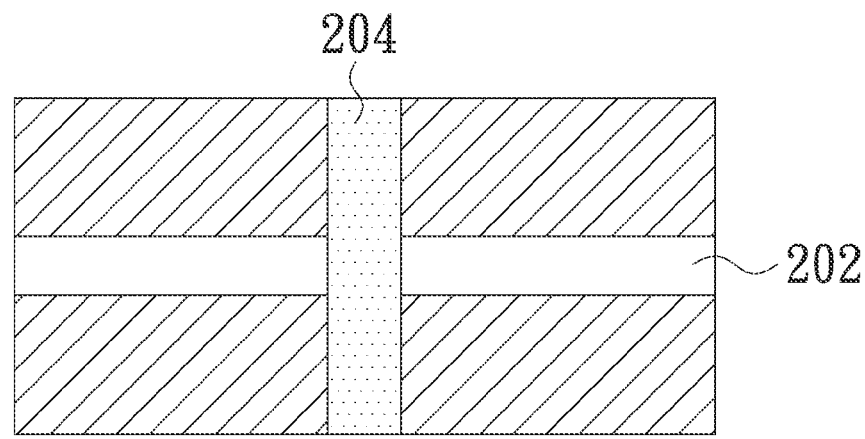
FIG. 2A is a schematic view illustrating a sensed image of a touch surface of an optical touch system not yet being touched by one single indicator object.
Figure 2B:
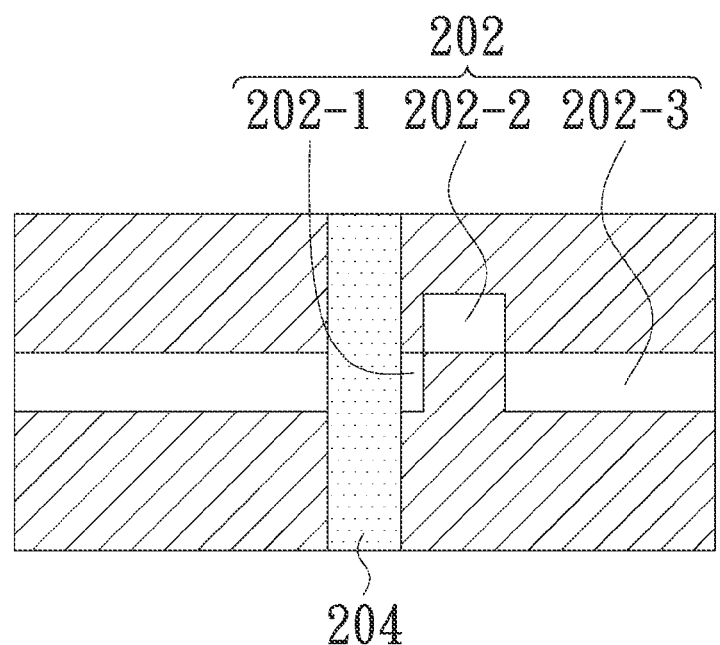
FIG. 2B is a schematic view illustrating a sensed image of a touch surface of an optical touch system being touched by one single indicator object.

FIG. 2A is a schematic view illustrating a sensed image of a touch surface of an optical touch system not yet being touched by one single indicator object; and FIG. 2B is a schematic view illustrating a sensed image of a touch surface of an optical touch system being touched by one single indicator object. In FIGS. 2A, 2B, the area 202 is referred to as a bright background formed by a light emitting device of the optical touch system; and the area 204 is referred to as a light-blocking point resulted by the indicator object. Compared with the continuous bright background 202 in FIG. 2A, the bright background 202 in FIG. 2B is constituted by three discontinuous segments 202-1, 202-2 and 202-3. It is because that the touch surface as illustrated in FIG. 2B has a deformation (i.e., a bulge segment 202-2), which is caused by the pressure resulted by the indicator object pressing the touch surface. In addition, the touch surface may also have a deformation caused by the gravity, when the touch surface is held by a user at one edge thereof Therefore, the conventional optical touch system may incorrectly determine that there are two indicator objects on the touch surface based on the number of the light-blocking point in the bright background 202 as illustrated in FIG. 2B.

However, the optical touch system 100 of the present invention can prevent the aforementioned wrong indicator object number determination issue from occurring. Please refer back to FIG. 1. When one single indicator object is closing to but not yet touching the touch surface 110, the two images, respectively captured by the image sensing devices 130-1, 130-2 in the first period, both have one light-blocking point only and the two images, respectively captured by the image sensing devices 130-1, 130-2 in the second period, both have one reflective point only. Thus, the processing unit 150 accordingly determines that there is one indicator object closing to the touch surface 110. In another case, when one single indicator object is closing to and also touching the touch surface 110, the two images, respectively captured by the image sensing devices 130-1, 130-2 in the first period, both may have at least two light-blocking points and the two images, respectively captured by the image sensing devices 130-1, 130-2 in the second period, both have one reflective point only. Thus, the processing unit 150 accordingly determines that there is one indicator object touching the touch surface 110.

It is to be noted that the processing unit 150 is further electrically connected to the three light emitting elements 120-1, 120-2 and 120-3 and the two illumination devices 140-1, 140-2, and thereby capable of controlling the light emitting elements 120-1, 120-2 and 120-3 to be turned-on and the illumination devices 140-1, 140-2 to be turned-off in the first period and controlling the light emitting elements 120-1, 120-2 and 120-3 to be turned-off and the illumination devices 140-1, 140-2 to be turned-on in the second period. In addition, the illumination devices 140-1, 140-2 both can be realized by an infrared illumination device or a laser emitting device. Herein, it is to be understood that the image sensing devices 130-1, 130-2 both are required to employ an infrared filter device, through which only the infrared light can pass, if each one of the illumination devices 140-1, 140-2 is realized by an infrared illumination device; wherein the image sensing devices 130-1, 130-2 both are configured to capture the image of the touch surface 110 through the employed infrared filter devices.

Figure 3:
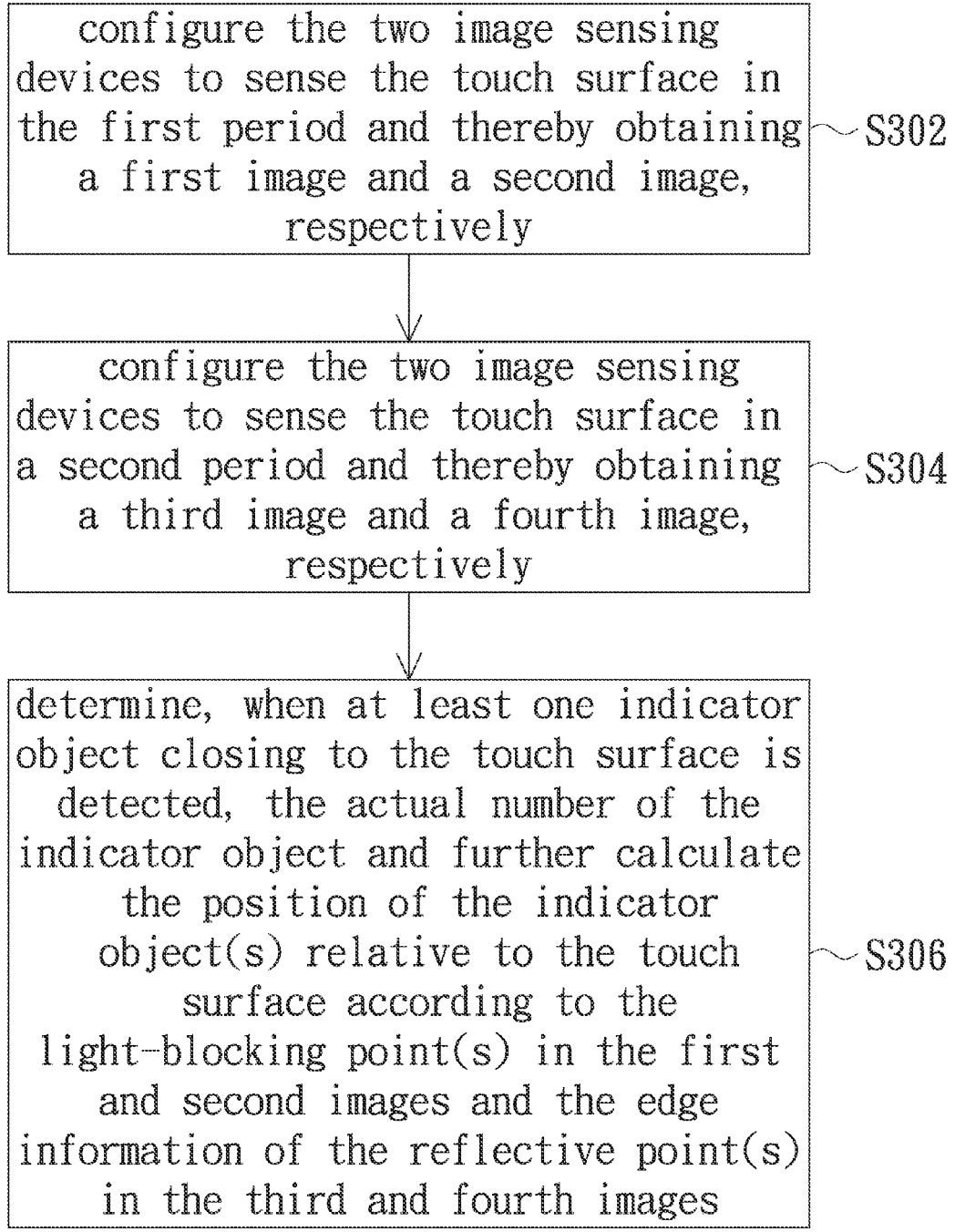
FIG. 3 is a schematic flowchart illustrating an operation method of an optical touch system in accordance with an embodiment of the present invention.

According to the aforementioned descriptions, the optical touch system 100 shown in FIG. 1 can be summarized to have some basic operation steps by those ordinarily skilled in the art as illustrated in FIG. 3, which is a schematic flowchart illustrating an operation method of an optical touch system in accordance with an embodiment of the present invention. Specifically, the optical touch system associated with this embodiment includes a touch surface, three light emitting elements, two image sensing devices and two illumination devices. The touch surface is configured to have a quadrilateral structure, which is defined by four sequentially-connected first, second, third and fourth edges thereof The three light emitting elements are disposed at the first, second and third edges, respectively, and configured to emit light to the touch surface in a first period. The two image sensing devices are disposed at an intersecting corner of the fourth and first edges and an intersecting corner of the fourth and third edges, respectively. The two illumination devices are disposed close to or inside the two image sensing devices, respectively, and configured to emit light to illuminate the touch surface in a second period.

As illustrated in FIG. 3, the operation method of an optical touch system in this embodiment includes steps of: configuring the two image sensing devices to sense the touch surface in the first period and thereby obtaining a first image and a second image, respectively (step S302); configuring the two image sensing devices to sense the touch surface in a second period and thereby obtaining a third image and a fourth image, respectively (step S304); determining, when at least one indicator object closing to the touch surface is detected, the actual number of the indicator object and further calculating the position of the indicator object(s) relative to the touch surface according to the light-blocking point(s) in the first and second images and the edge information of the reflective point(s) in the third and fourth images (step S306).

Figure 4:
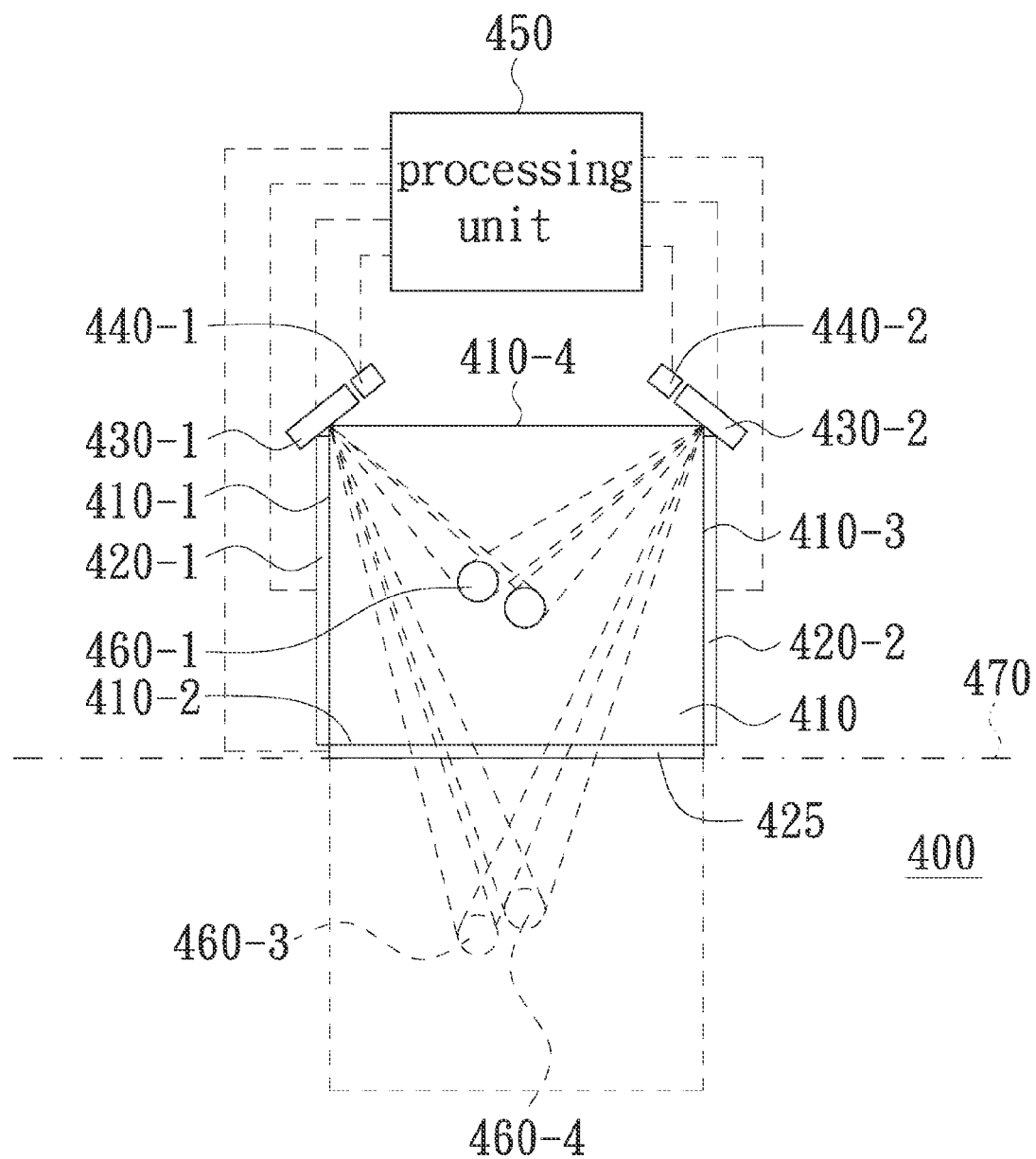
FIG. 4 is a schematic view of an optical touch system in accordance with another embodiment of the present invention.

FIG. 4 is a schematic view of an optical touch system in accordance with another embodiment of the present invention. As shown, the optical touch system 400 in this embodiment includes a touch surface 410, light emitting elements 420-1, 420-2, a reflective element 425, image sensing devices 430-1, 430-2, illumination devices 440-1, 440-2 and a processing unit 450. The touch surface 410 is configured to have a quadrilateral structure, which is defined by four sequentially-connected edges 410-1, 410-2, 410-3 and 410-4 thereof. The light emitting elements 420-1, 420-2 are disposed at the edges 410-1, 410-3, respectively, and configured to emit light to the touch surface 410 in a first period. The reflective element 425 is disposed at the edge 410-2. In this embodiment, the reflective element 425 is realized by a mirror. In addition, it is to be noted that the part below the dotted line 470 in FIG. 4 is a virtual image of the touch surface 410 formed by the reflective element 425. The image sensing device 430-1 is disposed at an intersecting corner of the edges 410-4, 410-1; and the image sensing device 430-2 is disposed at an intersecting corner of the edges 410-4, 410-3.

The illumination devices 440-1, 440-2 are disposed close to or inside the image sensing devices 430-1, 430-2, respectively. In this embodiment, the illumination devices 440-1, 440-2 are disposed close to the image sensing devices 430-1, 430-2, respectively, and configured to emit light to illuminate the touch surface 410 in a second period. The processing unit 450 is electrically connected to the image sensing devices 430-1, 430-2 and configured to obtain the two images derived from the image sensing devices 430-1, 430-2 sensing the touch surface 410 in the first period and obtain another two images derived from the image sensing devices 430-1, 430-2 sensing the touch surface 410 in the second period.

In this embodiment, the processing unit 450 is further configured to, when detecting at least one indicator object (e.g., the indicator objects 460-1, 460-2) closing to the touch surface 410, determine that which indicator object(s) (e.g., the indicator objects 460-3, 460-4) in the two images captured in the first period is derived from the mirror image formed by the reflective element 425 according to the relative position of the reflective point(s) in the two images captured in the second period.

Taking the two indicator objects 460-1, 460-2 with specific relative positions as illustrated in FIG. 4 as an example. As shown, the two image respectively derived from the image sensing device 430-1, 430-2 sensing the touch surface 410 in the first period both have four light-blocking points, and the four light-blocking points each are referred to as an image of a real indicator object by the processing unit 450 at this time. However, the two images respectively derived from the image sensing device 430-1, 430-2 sensing the touch surface 410 in the second period both have two light-blocking point only, due to the vertical indicator objects 460-3, 460-4 do not reflect light. Therefore, the processing unit 450 can determine that which indicator objects (e.g., the indicator objects 460-3, 460-4) in the two images captured in the first period are derived from the mirror image formed by the reflective element 425 according to the relative positions of the two light-blocking points in the two images captured in the second period. Consequently, the processing unit 450 is further configured to calculate the position of the indicator object relative to the touch surface 410 according to the image of real indicator object and the image of vertical indicator object.

It is to be noted that the processing unit 450 is further electrically connected to the two light emitting elements 420-1, 420-2 and the two illumination devices 440-1, 440-2, and thereby capable of controlling the light emitting elements 420-1, 420-2 to be turned-on and the illumination devices 440-1, 440-2 to be turned-off in the first period and controlling the light emitting elements 420-1, 420-2 to be turned-off and the illumination devices 140-1, 140-2 to be turned-on in the second period. In addition, the illumination devices 440-1, 440-2 both can be realized by an infrared illumination device or a laser emitting device. Herein, it is to be understood that the image sensing devices 430-1, 430-2 both are required to employ an infrared filter device, through which only the infrared light can pass, if each one of the illumination devices 440-1, 440-2 is realized by an infrared illumination device; wherein, the image sensing devices 430-1, 430-2 are configured to capture the image of the touch surface 410 through the employed infrared filter devices.

Figure 5:
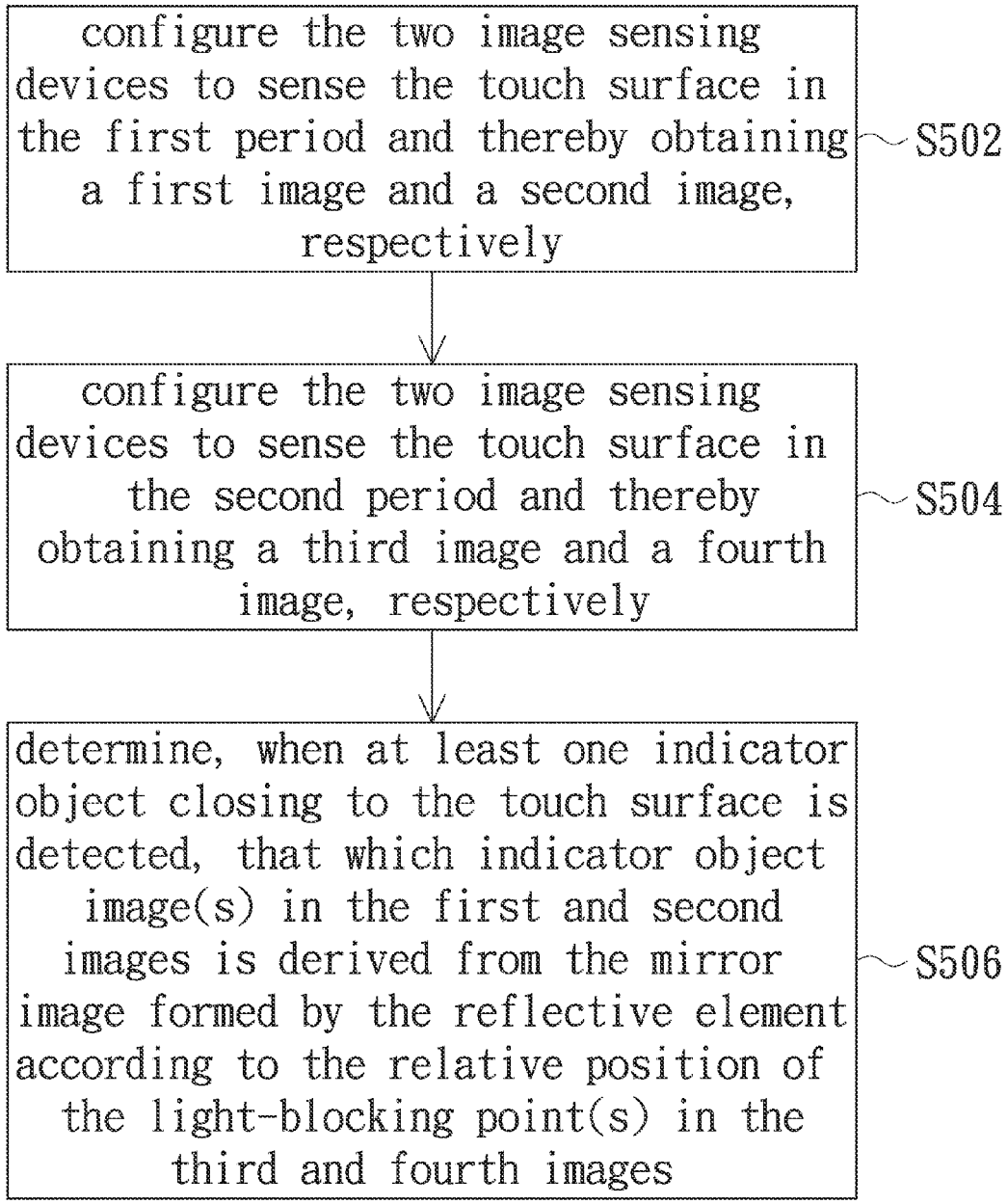
FIG. 5 is a schematic flowchart illustrating an operation method of an optical touch system in accordance with another embodiment of the present invention.

According to the aforementioned descriptions, the optical touch system 400 shown in FIG. 4 can be summarized to have some basic operation steps by those ordinarily skilled in the art as illustrated in FIG. 5, which is a schematic flowchart illustrating an operation method of an optical touch system in accordance with another embodiment of the present invention. Specifically, the optical touch system associated with this embodiment includes a touch surface, two light emitting elements, a reflective element, two image sensing devices and two illumination devices. The touch surface is configured to have a quadrilateral structure, which is defined by four sequentially-connected first, second, third and fourth edges thereof. The two light emitting elements are disposed at the first and third edges, respectively, and are configured to emit light to the touch surface in a first period. The reflective element is disposed at the second edge of the touch surface. The two image sensing devices are disposed at an intersecting corner of the fourth and first edges and an intersecting corner of the fourth and third edges, respectively. The two illumination devices are disposed close to or inside the two image sensing devices, respectively, and are configured to emit light to illuminate the touch surface in a second period.

As illustrated in FIG. 5, the operation method of an optical touch system in this embodiment includes steps of: configuring the two image sensing devices to sense the touch surface in the first period and thereby obtaining a first image and a second image, respectively (step S502); configuring the two image sensing devices to sense the touch surface in the second period and thereby obtaining a third image and a fourth image, respectively (step S504); determining, when at least one indicator object closing to the touch surface is detected, that which indicator object image(s) in the first and second images is derived from the mirror image formed by the reflective element according to the relative position of the light-blocking point(s) in the third and fourth images (step S506).

Figure 6:
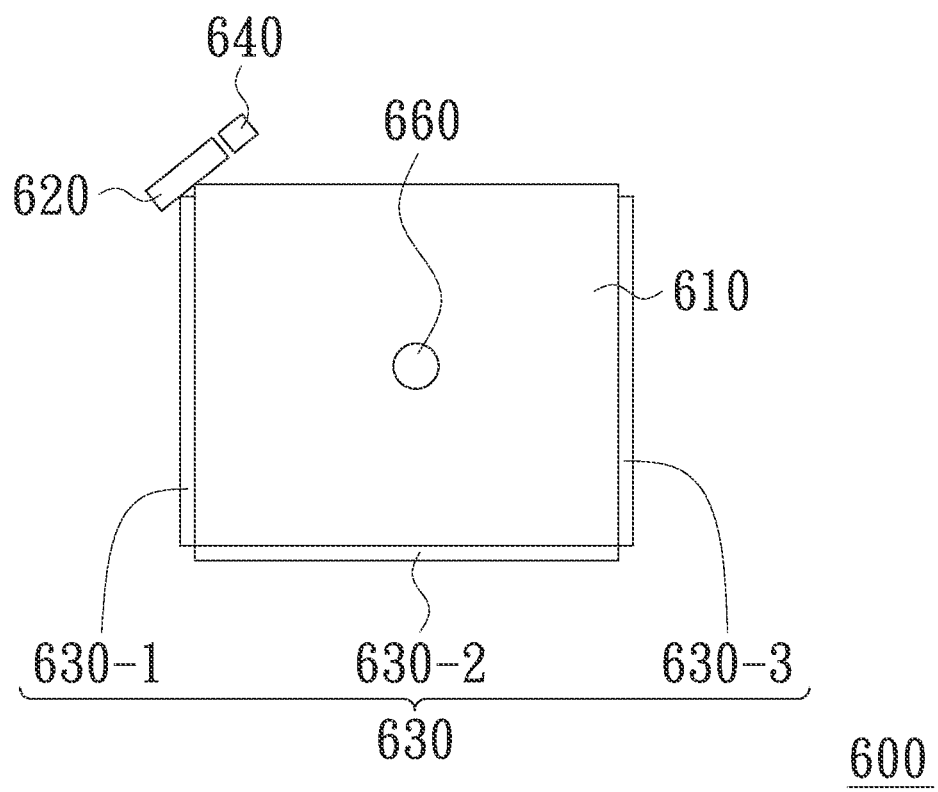
FIG. 6 is a schematic view of an optical touch system in accordance with still another embodiment of the present invention.

FIG. 6 is a schematic view of an optical touch system in accordance with still another embodiment of the present invention. As shown, the optical touch system 600 in this embodiment includes a touch surface 610, an image sensing device 620, a background light emitting element 630 and an illumination device 640. The background light emitting element 630 is configured to emit light to illuminate the touch surface 610 from at least one edge thereof in a first period so as to generate a bright background for the image captured by the image sensing device 620. The illumination device 640 is configured to provide illumination light to the touch surface 610 in a second period. Specifically, the image sensing device 620, in the first period, is configured to capture the image of an indicator object 660 blocking a portion of the bright background; and the image sensing device 620, in the second period, is configured to capture the image of the indicator object 660 reflecting the illumination light.

In this embodiment, the background light emitting element 630 can be realized by three light guide modules 630-1, 630-2 and 630-3, which are disposed at the three edges of the touch surface 610, respectively. In addition, the light guide module 630-2 can be replaced by a reflective element in another embodiment. In other words, the background light emitting element 630 may include a light guide module(s), disposed at one or more edges of the touch surface 610, and a reflective element(s), disposed at another one or more edge of the touch surface 610. Moreover, it is understood that the optical touch system 600 may include more than one image sensing devices 620; but the present invention is not limited thereto.

Figure 7:
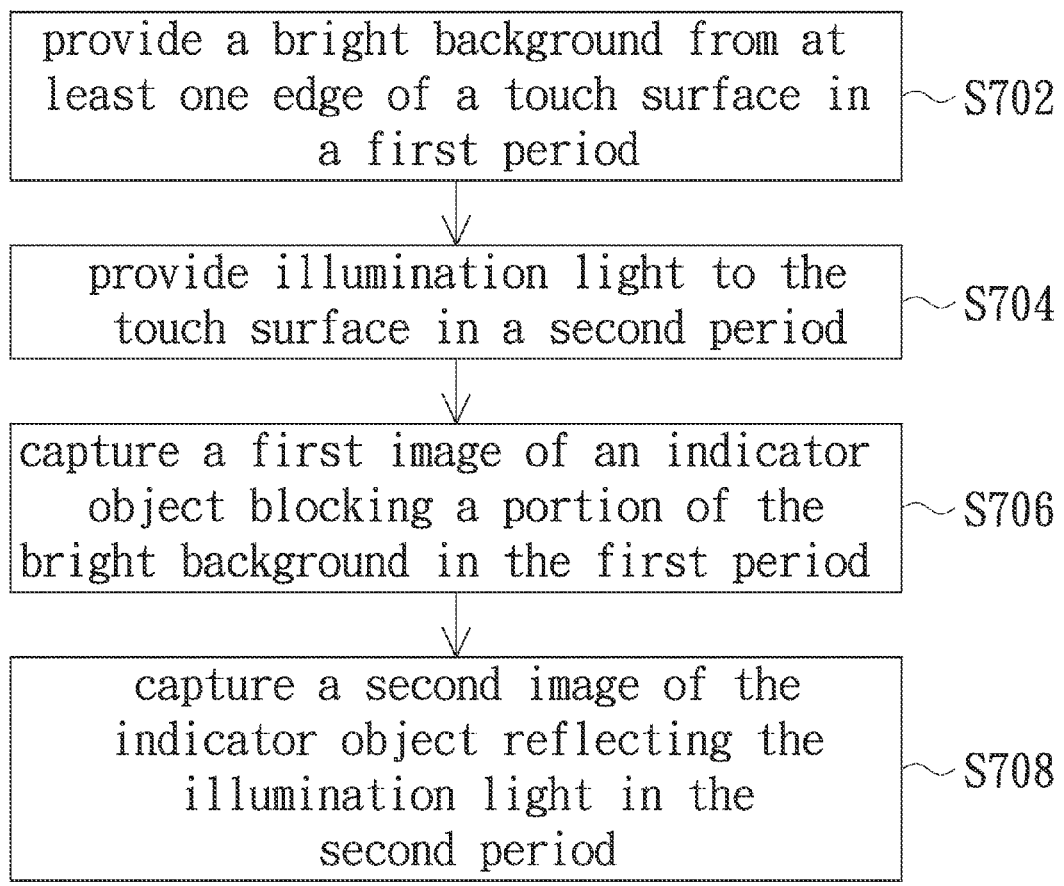
FIG. 7 is a schematic flowchart illustrating an optical touch control method in accordance with an embodiment of the present invention.

To sum up, according to the descriptions of each one of the aforementioned embodiments, an optical touch control method can be summarized to have some basic operation steps by those ordinarily skilled in the art as illustrated in FIG. 7, which is a schematic flowchart illustrating an optical touch control method in accordance with an embodiment of the present invention. As illustrated in FIG. 7, the optical touch control method in this embodiment includes steps of: providing a bright background from at least one edge of a touch surface in a first period (step S702); providing illumination light to the touch surface in a second period (step S704); capturing a first image of an indicator object blocking a portion of the bright background in the first period (step S706); and capturing a second image of the indicator object reflecting the illumination light in the second period (step S708).

In summary, the optical touch system according to the present invention includes at least one light emitting element, at least one illumination device and at least one image sensing device. The light emitting element is disposed at an edge(s) of a touch surface of the optical touch system and configured to emit light to the touch surface in a first period and thereby generating a bright background for the image captured by the image sensing device. The illumination device is configured to provide illumination light to the touch surface in a second period so that an indicator object on the touch surface can reflect the illumination light. The image sensing device is configured sensing the touch surface and thereby obtaining two images in the first and second periods. If there are at least two indicator objects closing to the touch surface, the indicator objects in the image captured by the image sensing device in the first period will present light-blocking points and block a portion of the bright background; and the indicator objects in the image captured by the image sensing device in the second period will present reflective points. Thus, the optical touch system according to the present invention can correctly determine the actual number of the indicator object and consequently calculate the positions of the indicator objects relative to the touch surface according to the aforementioned light-blocking points and the edge information of the reflective points while performing the multi-touch operation.

While the disclosure has been described in terms of what is presently considered to be the most practical and preferred embodiments, it is to be understood that the disclosure needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An optical touch system, comprising:
   a touch surface configured to have a quadrilateral structure defined by a first, second, third and fourth edges connected sequentially;
   three light emitting elements disposed at the first, second and third edges, respectively, and configured to emit light to the touch surface in a first period;
   two image sensing devices disposed at an intersecting corner of the fourth and first edges and an intersecting corner of the fourth and third edges, respectively;
   two illumination devices disposed close to or inside the two image sensing devices, respectively, and configured to emit light to illuminate the touch surface in a second period; and
   a processing unit electrically connected to the two image sensing devices and configured to control the two image sensing devices to sense the touch surface in the first period and thereby obtaining a first image and a second image, respectively, and control the two image sensing devices to sense the touch surface in the second period and thereby obtaining a third image and a fourth image, respectively.

2. The optical touch system according to claim 1, wherein the processing unit is further configured to, when at least one indicator object closing to the touch surface is detected, determine the actual number of the indicator object(s) and further calculate the position of the indicator object(s) relative to the touch surface according to a light-blocking point(s) in the first and second images and edge information of a reflective point(s) in the third and fourth images.

3. The optical touch system according to claim 2, wherein the processing unit determines that there are two indicator objects closing to the touch surface if the first and second images both have two light-blocking points and the third and fourth images both have two reflective points.

4. The optical touch system according to claim 2, wherein the processing unit determines that there are two indicator objects closing to the touch surface if one of the first and second images has two light-blocking points, the other one of the first and second images has one light-blocking point only, and the third and fourth images both have two reflective points, wherein an overlapping area of the two reflective points in one of the third and fourth images covers an image edge of one of the two reflective points.

5. The optical touch system according to claim 2, wherein the processing unit determines that there are one indicator object closing to the touch surface if the first and second images both have one light-blocking point only and the third and fourth images both have one reflective point only.

6. The optical touch system according to claim 1, wherein the processing unit is further electrically connected to the three light emitting elements and the two illumination devices, and the processing unit is further configured to turn on the three light emitting elements and turn off the two illumination devices in the first period and turn off the three light emitting elements and turn on the two illumination devices in the second period.

7. The optical touch system according to claim 1, wherein the two illumination devices both are realized by an infrared illumination device or a laser emitting device, the two image sensing devices both comprise an infrared filter device, through which only the infrared light can pass, if the two illumination devices both are realized by an infrared illumination device, and accordingly the two image sensing devices both are configured to capture images of the touch surface through the infrared filter devices thereof.

8. An optical touch system, comprising:
   a touch surface configured to have a quadrilateral structure defined by a first, second, third and fourth edges connected sequentially;
   two light emitting elements disposed at the first and third edges, respectively, and configured to emit light to the touch surface in a first period;
   a reflective element disposed at the second edge;
   two image sensing devices disposed at an intersecting corner of the fourth and first edges and an intersecting corner of the fourth and third edges, respectively;
   two illumination devices disposed close to or inside the two image sensing devices, respectively, and configured to emit light to illuminate the touch surface in a second period; and
   a processing unit electrically connected to the two image sensing devices configured to control the two image sensing devices to sense the touch surface in the first period and thereby obtaining a first image and a second image, respectively, and control the two image sensing devices to sense the touch surface in the second period and thereby obtaining a third image and a fourth image, respectively.

9. The optical touch system according to claim 8, wherein the processing unit is further configured to, at least one indicator object closing to the touch surface is detected, determine that which indicator object(s) in the first and second images captured is derived from the a mirror image formed by the reflective element according to the relative position of the reflective point(s) in the third and fourth images.

10. The optical touch system according to claim 8, wherein the processing unit is further electrically connected to the two light emitting elements and the two illumination devices, and the processing unit is further configured to turn on the two light emitting elements and turn off the two illumination devices in the first period and turn off the two light emitting elements and turn on the two illumination devices in the second period.

11. The optical touch system according to claim 8, wherein the two illumination devices both are realized by an infrared illumination device or a laser emitting device, the two image sensing devices both comprise an infrared filter device, through which only the infrared light can pass, if the two illumination devices both are realized by an infrared illumination device, and accordingly the two image sensing devices both are configured to capture images of the touch surface through the infrared filter devices thereof.

12. An optical touch system, comprising:
   a touch surface;
   at least one image sensing device;
   a background light emitting element configured to emit light to illuminate the touch surface from at least one edge thereof in a first period and thereby generating a bright background for an image captured by the image sensing device; and
   an illumination device configured to provide illumination light to the touch surface in a second period;
   wherein the at least one image sensing device is configured to capture a first image of an indicator object blocking a portion of the bright background in the first period and capture a second image of the indicator object reflecting the illumination light in the second period.

13. The optical touch system according to claim 12, wherein the background light emitting element is a light guide module disposed at three edges of the touch surface.

14. The optical touch system according to claim 12, wherein the background light emitting element comprises:
   a light guide module disposed at least one edge of the touch surface; and
   a reflective element disposed another edge(s) of the touch surface.

15. An optical touch control method, comprising:
   providing a bright background from at least one edge of a touch surface in a first period;
   providing illumination light to the touch surface in a second period;
   capturing a first image of an indicator object blocking a portion of the bright background in the first period; and
   capturing a second image of the indicator object reflecting the illumination light in the second period.

* * * * *